United States Patent
Mallett et al.

(10) Patent No.: US 10,113,477 B2
(45) Date of Patent: Oct. 30, 2018

(54) WASTEGATE BALL-VALVE

(71) Applicant: BorgWarner Inc., Auburn Hills, MI (US)

(72) Inventors: Christoper J. Mallett, Denton, TX (US); Richard Haering, Wallersdorf (DE)

(73) Assignee: BorgWarner Inc., Auburn Hills, MI (US)

( * ) Notice: Subject to any disclaimer, the term of this patent is extended or adjusted under 35 U.S.C. 154(b) by 326 days.

(21) Appl. No.: 14/776,124

(22) PCT Filed: Mar. 21, 2014

(86) PCT No.: PCT/US2014/031393
§ 371 (c)(1),
(2) Date: Sep. 14, 2015

(87) PCT Pub. No.: WO2014/160594
PCT Pub. Date: Oct. 2, 2014

(65) Prior Publication Data
US 2016/0032818 A1    Feb. 4, 2016

Related U.S. Application Data

(60) Provisional application No. 61/805,982, filed on Mar. 28, 2013.

(51) Int. Cl.
*F16K 25/00* (2006.01)
*F02B 37/18* (2006.01)
(Continued)

(52) U.S. Cl.
CPC .......... *F02B 37/183* (2013.01); *F02B 37/186* (2013.01); *F16K 1/2014* (2013.01);
(Continued)

(58) Field of Classification Search
USPC ....................... 251/186, 86, 84, 87
See application file for complete search history.

(56) References Cited

U.S. PATENT DOCUMENTS 784,996 A * 3/1905 Ely ................... F16C 11/069
                                                  251/86
1,409,127 A * 3/1922 Wasem ................ F16K 1/14
                                                  251/86

(Continued)

FOREIGN PATENT DOCUMENTS

| JP | 10078155 | 3/1998 |
|----|----------|--------|
| WO | 2007021132 | 2/2007 |
| WO | 2012163638 | 12/2012 |

*Primary Examiner* — Umashankar Venkatesan
(74) *Attorney, Agent, or Firm* — Eric L. Doyle; Stephan A. Pendorf; Patent Central LLC

(57) ABSTRACT

A turbocharger (10) has an improved wastegate valve assembly (32) wherein a valve member (35) moves freely within a lever arm (34A), and therefore, is displaceable sidewardly across the opening (28) of the wastegate port (28). The valve member (35) and associated seat (36) respectively have male and female forms so as to sealingly engage with each other when the valve body (35) is in the closed position. As such, the valve member (35) can move freely as it engages the seat (36) to provide a tight uniform seal therebetween. Additionally, the seat (36) may be formed as an insert which fits within the wastegate port (28) and is also free floating in the direction extending across the port (28) which further assists in self-centering of the valve member (35) and seat (36).

8 Claims, 5 Drawing Sheets

(51) Int. Cl.
  *F16K 1/20* (2006.01)
  *F16K 1/32* (2006.01)
  *F16K 27/02* (2006.01)

(52) U.S. Cl.
  CPC .............. *F16K 1/2042* (2013.01); *F16K 1/32* (2013.01); *F16K 27/0245* (2013.01); *Y02T 10/144* (2013.01)

(56) References Cited

U.S. PATENT DOCUMENTS

| | | | | |
|---|---|---|---|---|
| 1,773,110 | A * | 8/1930 | Meyers | F16K 1/14 251/152 |
| 2,405,736 | A * | 8/1946 | Daily | H01M 2/1205 251/338 |
| 3,101,739 | A * | 8/1963 | Pribonic | F16K 17/0406 137/529 |
| 3,406,706 | A * | 10/1968 | Zakka | F16K 1/14 137/331 |
| 3,529,805 | A * | 9/1970 | Callahan, Jr. | F16K 1/14 251/214 |
| 4,519,579 | A | 5/1985 | Brestel et al. | |
| 9,145,825 | B2 * | 9/2015 | Kierat | F02B 37/18 |
| 9,556,786 | B2 * | 1/2017 | Marques | F16K 1/2014 |
| 2011/0000209 | A1 * | 1/2011 | Boening | F01D 17/20 60/602 |

* cited by examiner

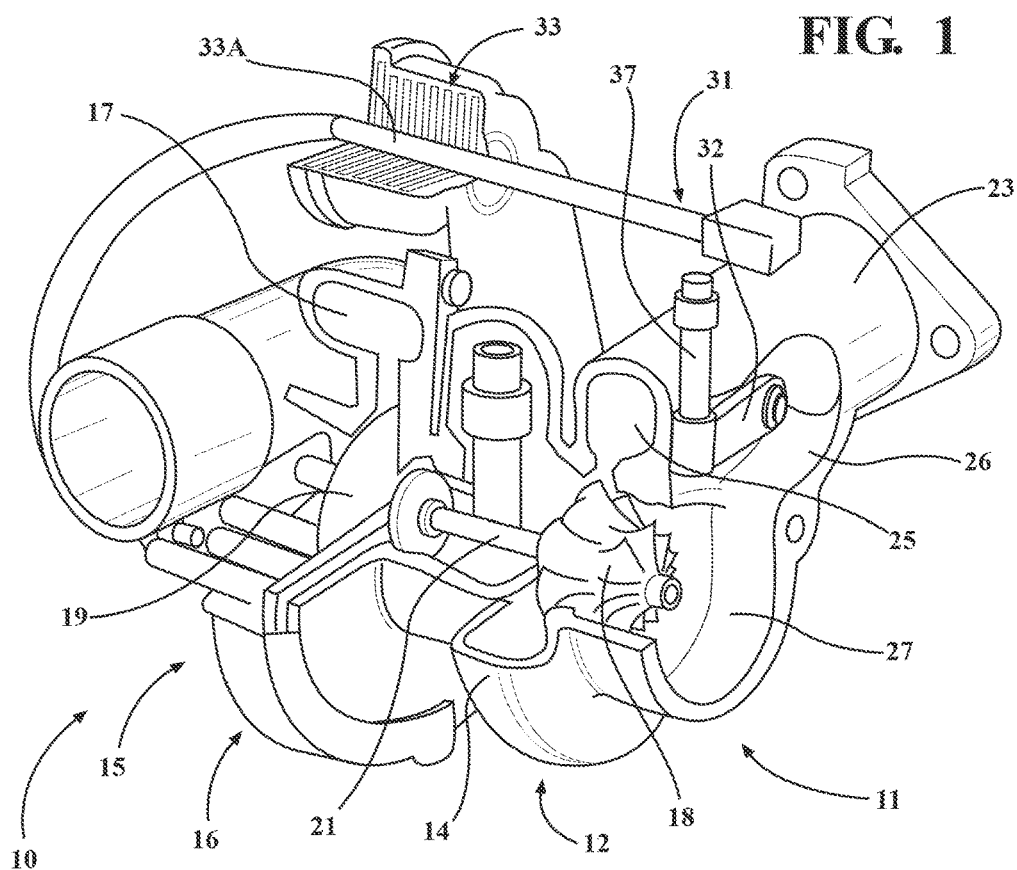
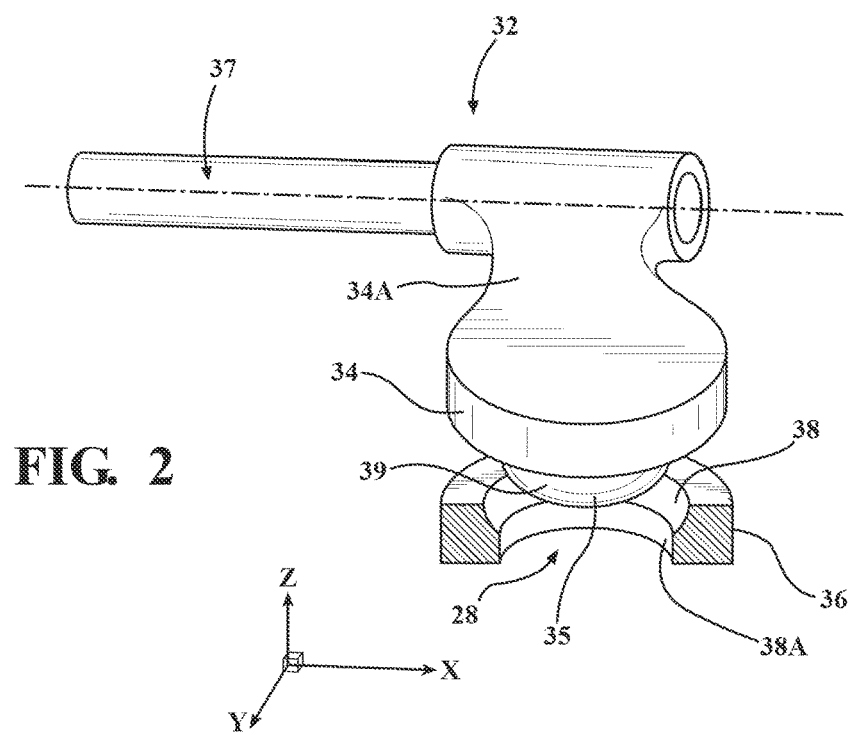
FIG. 1
FIG. 2

# WASTEGATE BALL-VALVE

CROSS-REFERENCE TO RELATED APPLICATION

This application claims priority to and all benefits of U.S. Provisional Application No. 61/805,982 filed on Mar. 28, 2013, and entitled "Wastegate Ball-Valve".

FIELD OF THE INVENTION

The invention relates to a turbocharger with an improved wastegate valve and more particularly, to a wastegate ball valve which provides self-centering of a ball-shaped valve member within its seat to provide an improved exhaust gas seal as well as flow control.

BACKGROUND OF THE INVENTION

Turbochargers are provided on an engine to deliver air to the engine intake at a greater density than would be possible in a normal aspirated configuration. This allows more fuel to be combusted, thus boosting the engine's horsepower without significantly increasing engine weight.

Generally, turbochargers use the exhaust flow from the engine exhaust manifold, which enters the turbine housing at a turbine inlet, to thereby drive a turbine wheel, which is located in the turbine housing. The turbine wheel is affixed to one end of a shaft, wherein the shaft drives a compressor wheel mounted on the other end of the shaft. As such, the turbine wheel provides rotational power to drive the compressor wheel and thereby drive the compressor of the turbocharger. This compressed air is then provided to the engine intake as referenced above.

In designing the turbine stage, selection of the turbine stage components is made relative to a preferred performance point. In a simple uncontrolled fixed-nozzle turbocharger system, an uncontrolled turbocharger is designed so that optimal performance is reached at high engine speeds. However, at other speeds the turbocharger provides suboptimal boost or air volume to the engine.

Controlled turbochargers provide improved performance, in that the turbine optimal operating point is already reached at low or medium engine speeds. Generally in a controlled system, when the flow rate of exhaust gases increases and the turbocharging pressure becomes too high, part of the exhaust gases are discharged into the surrounding atmosphere through a wastegate so as to bypass the turbine.

Typically, the exhaust gas flows through a volute defined within the turbine housing or casing. Further, a wastegate passage is also provided which is separated from the volute by an intermediate wall. To provide for wastegate flow, a wastegate port is provided in the wall which port is controlled by a wastegate valve.

The wastegate valve is selectively openable and closable during operation of the turbocharger. In one known wastegate valve, a flap type valve is provided which has a valve body having a valve face which faces toward and abuts against a valve seat when the valve body is in a closed position. The valve face and an opposing face of the valve seat typically conform to each other and have rigid, complementary shapes, which are intended to provide a tight seal. However, an optimum seal may be prevented if the ball and seat faces do not conform well to each other, or are misaligned. For example, there may be geometric misalignment due to misalignment tolerances present during assembly, and also due to thermodynamic expansion or contraction during operation of the turbocharger.

SUMMARY OF THE INVENTION

It is an object of the invention to provide a wastegate valve which overcomes disadvantages with known wastegate valves.

The invention relates to a wastegate valve for a turbocharger which provides an improved seal between a valve member and its associated seat which thereby provides an improved seal against exhaust gas flow between the turbine inlet and the wastegate passage. In the improved wastegate valve, the valve member has a tapered sealing surface, for example, like a ball shape, wherein at least one of the valve member and associated seat float freely relative to each other across the valve opening to allow self-centering of the ball within the seat.

More particularly as to the wastegate valve, this valve typically includes a valve body on the end of a lever arm, which lever arm is pivotally supported on the turbine housing so as to open and close a wastegate port. The wastegate port includes a valve seat in surrounding relation thereto, and the valve body includes a valve member which is removably received by the seat to define a seal when engaged together. The valve body is moved by an actuator and can pivot into the wastegate port to a first closed position which closes the wastegate port, and pivot out of the wastegate port to a second open position which opens the wastegate port. Therefore, a controlled portion of exhaust gas may flow through the wastegate passage which in turn flows to a turbine outlet, thereby bypassing the turbine.

The valve member preferably has a sealing surface which is at least semi-spherical such as a ball shape. The shape of the valve member preferably is tapered or converges in the direction of the wastegate port so that the opposing surfaces of the valve member and seat generate contact forces which act in the radial and axial directions. The valve member moves freely within a pocket formed in the valve body on the end of the lever arm, and therefore, is displaceable sidewardly across the opening of the wastegate port in response to the radial contact forces. The valve member also may have some ability to float toward and away from the seat when subjected to the axial contact forces to further assist in providing a tight seal.

The valve member and seat respectively have male and female forms so as to sealingly engage with each other when the valve body is in the closed position. As such, the valve member can move freely in the axial and/or radial directions as it engages the seat to provide a tight uniform seal therebetween. This design consistently reseats itself to thereby provide a consistent high quality seal over the lifetime of the turbocharger. Additionally, the seat may be formed as an insert which fits within the wastegate port such that the seat also is free floating in the radial directions extending across the port which further assists in self-centering the valve member and seat.

Other objects and purposes of the invention, and variations thereof, will be apparent upon reading the following specification and inspecting the accompanying drawings.

BRIEF DESCRIPTION OF THE DRAWINGS

FIG. 1 is a cut-away, pictorial view of a representative turbocharger.

FIG. 2 is an isometric view of a self-centering wastegate valve of a first embodiment of the invention.

DETAILED DESCRIPTION

Figure 3:
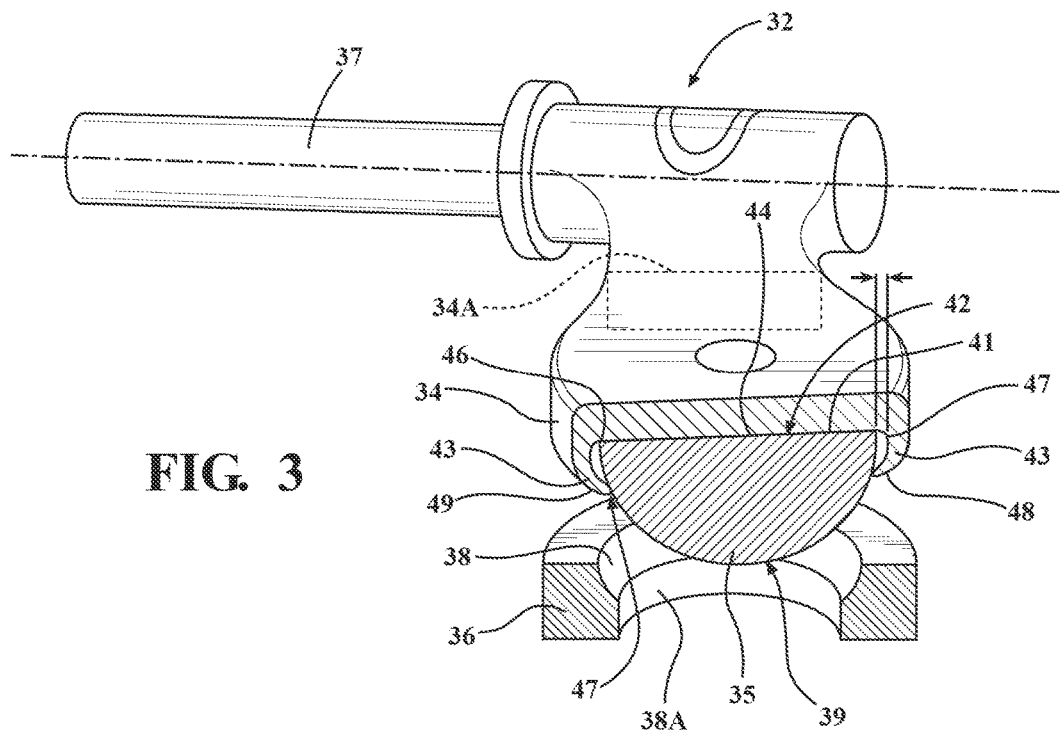
FIG. 3 is a cross-sectional side view of the first embodiment of the wastegate valve.

Referring to the cut-away view of FIG. 1, a turbocharger (10) is shown which includes a turbine unit (11) that defines a turbine housing or casing (12) having a volute (14) extending circumferentially therein. Turbocharger (10) further includes a compressor unit (15) which is provided in combination with the turbine unit (11) in a conventional manner. The compressor unit (15) includes a compressor housing (16) and a compressor volute (17).

The turbocharger (10) has the basic combination of the turbine unit (11) and the compressor unit (15) which respectively include a turbine wheel (18) and a compressor wheel (19) that are rotatably connected by a shaft (21). As seen in FIG. 1, the turbine unit (11) is supplied with exhaust gas through the turbine inlet (23). The volute (14) further has an intermediate wall (25) which divides the volute (14) from a wastegate passage (26) which discharges into the turbine outlet (27).

To divert a portion of the exhaust gas flow from the turbine inlet (23) during operation of the turbocharger (10), the volute wall (25) includes a wastegate port (28) (FIG. 2). The flow of exhaust gas flows from the inlet (23) to either the volute (14) or both the volute (14) and the wastegate passage (26) depending upon the operating condition of the turbocharger (10). To provide for a controlled wastegate flow, the wastegate port (28) is controlled by a wastegate valve assembly (31) which includes a wastegate valve (32) that seats within the port (28) and is selectively openable and closable during operation of the turbocharger (10).

As seen in FIG. 1, the volute valve (32) is shown in the closed position wherein the exhaust gas is routed into the volute (14) through the turbine inlet (23) and this flow is restricted to the volute (14) due to the closed condition of the wastegate valve (32). The valve (32) also is pivotable to the open condition of FIG. 2 wherein exhaust gas now is flowable into the wastegate passage (26). The wastegate valve (32) is operated by an actuator assembly (33) (FIG. 1) which includes an actuator rod (37) that pivots the wastegate valve (32) so as to selectively open and close the wastegate port (28) and thereby control a flow of a portion of the exhaust gas into a wastegate passage (26). Therefore, a controlled portion of exhaust gas may flow through the wastegate passage (26) to the turbine outlet (27), thereby bypassing the turbine wheel (18).

The invention relates to an improved wastegate valve (32) which provides more efficient seal between the valve (32) and associated port (28) and better control the flow of the exhaust gas through the wastegate port (28) and the wastegate passage (26). More particularly as to the wastegate valve (32) shown in FIG. 2, this valve typically includes a valve body (34) which is supported on the distal free end of a valve arm (34A) which in turn is pivotally supported on the turbine housing (14) by a pivot rod (37) so as to open and close the wastegate port (28).

The pivot rod (37) is operated by the actuator assembly (33) of FIG. 1 so as to pivot the valve body (34) into the wastegate port (28) to a closed first position (FIG. 1) which closes the wastegate port (28), and pivot out of the wastegate port (28) to an open second position (FIG. 2) which opens the wastegate port (28).

The improved wastegate valve (32) includes a free-floating valve member (35) which provides an improved seal between the valve member (35) and its associated seat (36) and which thereby provides an improved seal against exhaust gas flow between the turbine inlet (23) and the wastegate passage (26). In the improved wastegate valve (32) of FIGS. 2-4, the valve member (35) floats freely relative to the associated valve seat (36) so as to be movable in the X and Y directions extending radially across the valve opening (28) to allow self-centering of the ball within the seat. Preferably the valve member (35) also is movable to a limited extent in the Z direction extending perpendicular to the X and Y directions extending axially in the direction of a port axis.

As to the valve seat (36), this seat (36) has an annular shape and is formed within the volute wall (25). The seat (36) could be machined into the volute wall (25) to define the perimeter of the port (28) although the seat (36) could also be an insert formed separate from the volute wall (25) and then fit into an opening or pocket designed to receive the valve seat (36). Such an insert could be pressed, welded, crimped or mechanically fixed in place. In any case in the embodiment of FIGS. 2-4, the valve seat (36) remains stationary in use. As will be described further herein, a movable, self-centering valve seat could also be provided.

The valve seat (36) generally includes an annular entry surface (38A) which defines the perimeter of the port (28) and defines the entry side thereof through which exhaust gas enters said port (28). The entry surface (38A) joins with an annular sealing surface (38) which faces towards the valve member (35) for sealing engagement therewith. In the illustrated embodiment of FIGS. 2-4, the sealing surface (38) has an arcuate or truncated concave shape which corresponds closely to the shape of the valve member (35). However, the sealing surface (38) may be significantly smaller or be simply defined by an edge of the port (28) to provide line contact with the valve member (35).

Preferably the valve member (35) has a semi-spherical valve face (39) wherein the convex curvature thereof corresponds to and abuttingly mates with the concave curvature of the sealing surface (38). To provide for self-centering of the valve member (35) relative to the valve seat (36), the valve member (35) is formed separate from the valve body (34) in the form of a partial sphere have the sealing surface (39) on one side and a flat interior face (41) on the opposite side. Preferably, the valve member (35) is formed less than a hemisphere.

The valve body (34) includes a pocket (42) which is defined by an outer body wall (43) that projects below a bottom pocket face (44). The pocket (42) receives the valve member (35) therein with the bottom pocket face (44) faces toward the interior face (41) of the valve member (350 in close relation therewith. Preferably, the pocket wall (43) is larger than the valve member (35) so that a small clearance space is formed between the outer edge (46) of the valve member (35) and the pocket wall (43) spaced radially outwardly therefrom.

As can be seen, the shape of the valve member (35) essentially is tapered or converges in the direction of the wastegate port (28) so that the opposing surfaces of the valve member (35) and seat generate (36) contact forces which act in the radial and axial directions. The valve member (35) moves freely within the pocket (42), and therefore, is displaceable sidewardly across the opening of the wastegate port (28) in response to the radial contact forces. The valve member (35) also may have some ability to float toward and away from the seat (36) when subjected to the axial contact forces to further assist in providing a tight seal.

Figure 4:
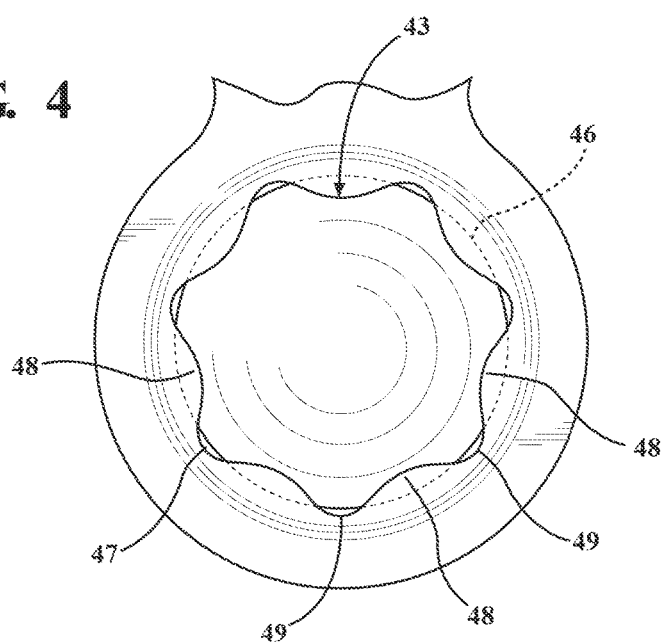
FIG. 4 is a bottom view of the first embodiment of the wastegate valve.

In the embodiment of FIGS. 3 and 4, the pocket wall (43) is relatively thin and is deformable. After insertion of the valve member (35) into the pocket (42) during assembly, the pocket wall (43) is crimped at circumferentially spaced locations to define a rolled over edge which overlaps the valve member edge (46) and prevents the valve member (35) from falling out of the pocket (42). The rolled over edge is defined by individual crimps (48) which are separated by undeformed wall portions (49) and thereby define a star or clover shape as seen in FIG. 4. As such, the crimps (48) define retainers which partially overlap and hold the valve member (35) within the pocket (42). While this clover design is one option, the overlapping crimp could be applied in a continuous 360 degree form about the periphery of the pocket wall (43) similar to the embodiment of FIG. 7 described below.

While the crimps (48) retain the valve member (35) in position, a clearance space (47) is provided between the crimps (48) and valve face (39) in all of the X, Y and Z directions as seen in FIGS. 3 and 4. As such, the valve member (35) moves freely within the pocket (42) and is displaceable sidewardly or radially across the opening of the wastegate port (28) in the X and Y directions. The valve member (35) also has an ability to float toward and away from the seat (36) in the axial Z direction to further assist in providing a tight seal. This allows the valve member (35) to displace in the axial direction, which allows the valve member (35) to tilt and better seat or engage the valve seat (36).

With this design, the valve member (35) and seat (36) respectively have male and female forms so as to sealingly engage with each other when the valve body (34) is in the closed position. As such, the valve member (35) can move freely as it engages the sealing surface (38) of the seat (36) to provide a tight uniform seal therebetween. This design consistently reseats itself, providing a consistent high quality seal over the lifetime of the turbocharger.

The remaining figures illustrate alternate designs which embody a self-centering feature for the wastegate valve (32).

Common reference numerals are used to indicate parts having a common structure or function.

Figure 5:
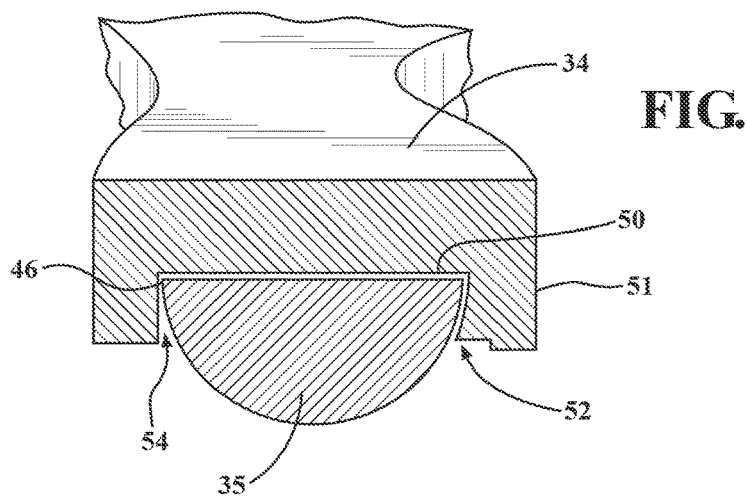
FIG. 5 is a cross-sectional side view of a second embodiment of the wastegate valve.
Figure 6:
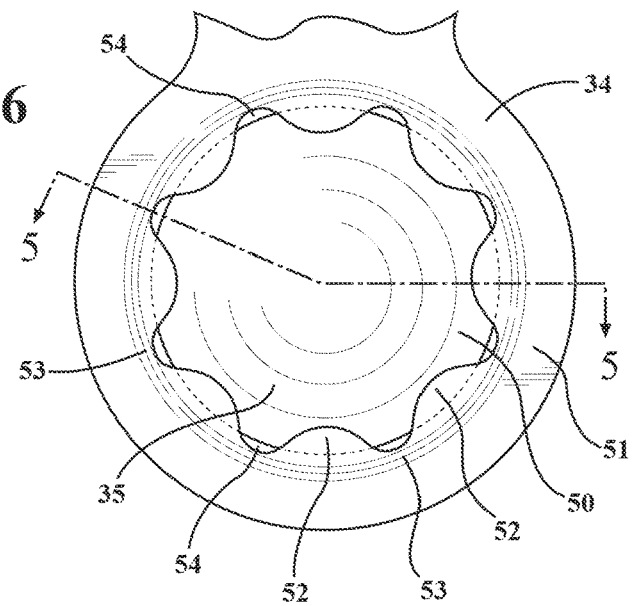
FIG. 6 is a bottom view thereof.

FIG. 5 is a cross-sectional side view of a second embodiment of the wastegate valve (32), while FIG. 6 is a bottom view thereof. In this embodiment, a pocket (50) is formed in the valve body (34) which is defined by an annular pocket wall (51). The valve body (34) is essentially the same in FIGS. 3 and 5 except that the pocket wall (51) has a significantly greater radial thickness in the X and Y directions in comparison to the wall (43) described above. In this design, the valve member (35) is still used and seats within pocket (50).

After the valve member (35) is installed in the pocket (50), the pocket wall (51) is then intermittently indented or deformed to define crimps or indents (52), which are circumferentially spaced to define the clover or star shape shown in FIG. 6. The pocket wall (51) also has undeformed portions (53). As such, the crimps (52) function as retainers which hold the valve member (35) within the pocket (50). Even after deformation, a radial clearance space (54) is provided between the outer edge (46) of the valve member (35) and the pocket wall (51). This clearance space (54) extends about the entire periphery of the valve member (35) to allow self-centering in the X and Y directions. Preferably, the clearance space (54) is also formed axially between the crimps (52) and the valve member (35) to permit movement in the Z direction, which, for example can permit tilting of the valve member (35) to better engage the valve seat (36) described above.

Figure 7:
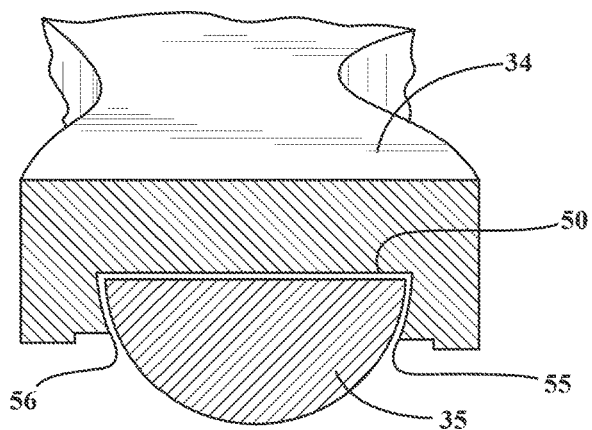
FIG. 7 is a cross-sectional side view of a third embodiment of the wastegate valve.

FIG. 7 is a cross-sectional side view of a third embodiment of the wastegate valve wherein the valve member (35) is held within the pocket (50) by a continuous, circumferential crimp or indentation (55) which retains the valve member (35) within the pocket (50). The crimp (55) is formed by any suitable deformation process or the like so that the crimp (55) also serves as a retainer. A clearance space (56) extends about the entire periphery of the valve member (35) to allow self-centering in the X and Y directions. Preferably, the clearance space is formed between the opposed surfaces of the crimp (55) and surface (39) of the valve body to also permit axial movement in the Z direction.

Figure 8:
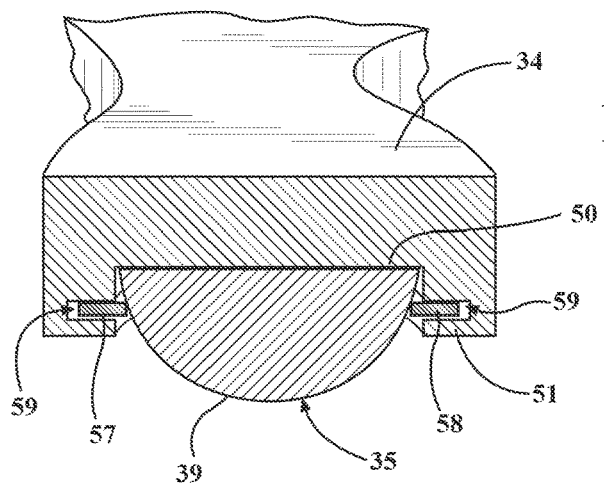
FIG. 8 is a cross-sectional side view of a fourth embodiment of the wastegate valve.

Next, FIG. 8 is a cross-sectional side view of a fourth embodiment of the wastegate valve wherein a separate structure is provided to serve as a retainer. In this embodiment, the pocket (50) is formed in the valve body (34) which is defined by the annular pocket wall (51). Here again, this pocket wall (51) is substantially thicker in the X and Y directions in comparison to the wall (43) described above. The valve member (35) seats within pocket (50).

Rather than deforming the pocket wall (51) to form retaining structure, the pocket wall (51) includes a circumferential slot (57) which opens radially inwardly toward surface (39) of valve member (35). The slot (57) receives a separate retainer (58) which preferably is formed as a spring clip which snaps into the slot (57). The retainer (58) is dimensioned so that it projects radially out of the slot (57) and contacts the surface (39) of the valve member (35). While contact is preferred, a radial clearance space could be provided which still prevents removal of the valve member (35) from the pocket (50).

To accommodate self-centering movement of the valve member (35), the slot (57) is formed deeper than the retainer (58) so that a small clearance space (59) is formed at the bottom of the slot (57). This clearance space (59) extends about the entire periphery of the valve member (35). As such, the retainer (58) can slide radially within the slot (57) to allow movement of the valve member (35) in the X and Y directions. Preferably, there is sufficient clearance in the Z direction between the valve member (35), pocket (50) and retainer (58) so as to permit axial movement in the Z direction.

Figure 9:
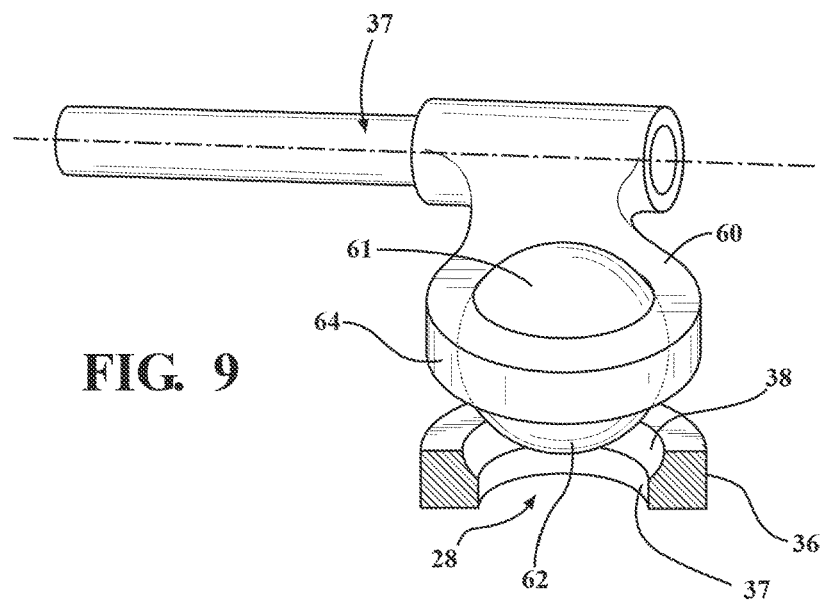
FIG. 9 is an isometric view of a fifth embodiment of the wastegate valve.

While the above-described valve member (35) is formed as a partial sphere, a complete sphere also could be used. While a sphere is described below, other alternate shapes could be used like an ovoid or the like. More particularly, FIG. 9 is an isometric view of a fifth embodiment of the wastegate valve wherein a valve body (60) includes a valve member (61) which projects vertically through the valve body (60). Here again, the valve member (61) is free-floating in the X, Y and Z directions to a limited extent.

In FIG. 9, the valve seat (36) is shown and constructed like that shown above in FIG. 2. The valve seat (36) generally includes an annular entry surface (37) which defines the perimeter of the port (28) and defines the entry side thereof through which exhaust gas enters said port (28). The entry surface (37) joins with an annular sealing surface (38) which faces towards the valve member (35) for sealing engagement therewith. In the illustrated embodiment of FIG. 9, the sealing surface (38) has an arcuate or partially concave shape which corresponds closely to the shape of the valve member (61). More particularly, the valve member (61) has a spherical or arcuate valve face (62) wherein the convex curvature thereof corresponds to and abuttingly mates with the concave curvature of the sealing surface (38).

Figure 10:
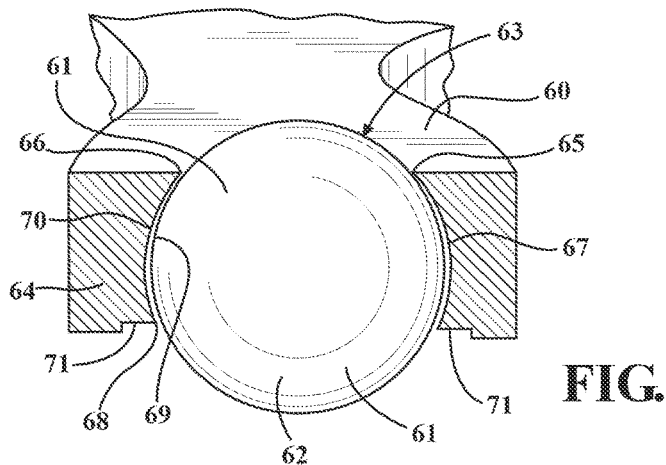
FIG. 10 is a cross-sectional side view of the fifth embodiment of the wastegate valve.

Referring to FIG. 10, the valve member (61) is able to self-center relative to the valve seat (36), wherein the valve member (61) is formed separate from the valve body (60) in the form of a sphere. The valve member (61) has the sealing surface (62) on one side which projects downwardly from the valve body (60) when assembled together. The valve member (61) includes an open-ended pocket (63) which is defined by a cylinder-like or annular outer body wall (64) that opens axially on both ends. One end and preferably the upper open end (65) is narrowed to define an opening (66) which is smaller than the major diameter of the wall (64), which diameter is defined at the axial midpoint as indicated by reference numeral (67).

The opposite open end (68) initially has a diameter that is substantially the same as the major diameter measured at location (67). At the least, the diameters at location (67) and at the open end (68) are greater than the diameter of the valve member (61) so as to define a radial clearance space between the opposing surfaces (69) and (70) of the wall (64) and valve member (61) respectively. Thus, the valve member (61) still has room to move within the pocket (63).

To retain the valve member (61) within the pocket (63), the wall (64) then is deformed to define a continuous indentation or crimp (71) which reduces the diameter of the open end (68) so that it is smaller than the maximum diameter of the valve member (61). This crimp (71) retains the valve member (61) within the pocket (63) to prevent the valve member (61) from falling out of either open end (65) or (68), but the valve member (61) still is movable within the pocket (63) to a limited extent. In this manner, the valve member (61) can self-center itself in the X, Y and Z directions when engaging the valve seat (36).

Figure 11:
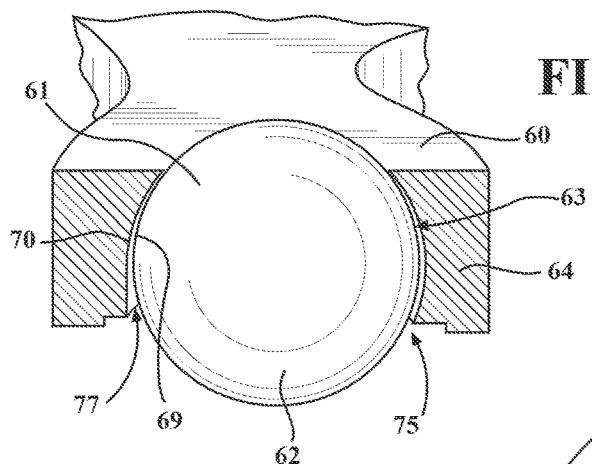
FIG. 11 is a cross-sectional side view of a sixth embodiment of the wastegate valve.
Figure 12:
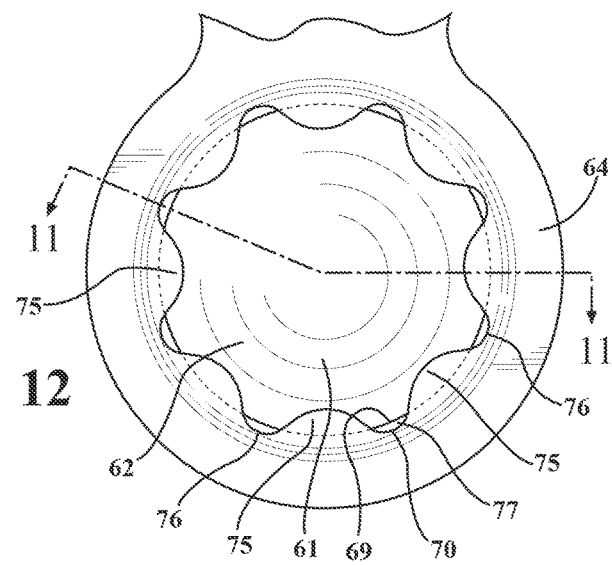
FIG. 12 is a bottom view thereof.

Alternatively, FIGS. 11 and 12 show a sixth embodiment of the wastegate valve where substantially the same structure is used as shown in FIG. 10. However, circumferentially-separated crimps (75) are used to retain the valve member (61) within the pocket (63). The pocket wall (64) is intermittently indented or deformed to define the crimps or indents (75), which are circumferentially spaced to define the clover or star shape shown in FIG. 12. The pocket wall (64) also has undeformed portions (76) such that the crimps (75) defined retainers which hold the valve member (61) within the pocket (63). Even after deformation, a radial clearance space (77) is provided between the opposed surfaces (69) and (70) seen in FIG. 12 and described above relative to FIG. 10. This clearance space (77) extends about the entire periphery of the valve member (61) where it is surrounded by the wall (64) to allow self-centering in the X, Y and Z directions.

Figure 13:
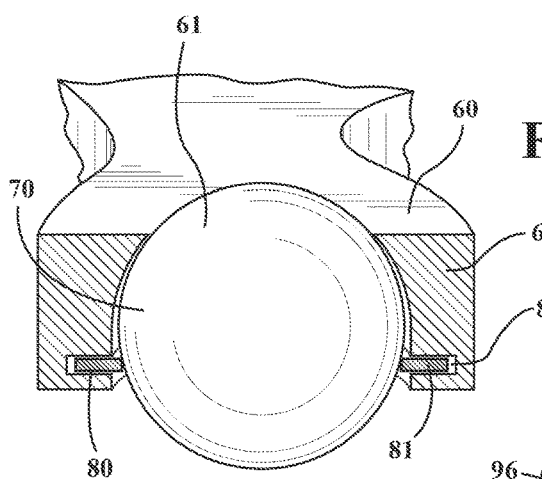
FIG. 13 is a cross-sectional side view of a seventh embodiment of the wastegate valve.

In a still further embodiment, FIG. 13 is a cross-sectional side view of a seventh embodiment of the wastegate valve which incorporates the retaining structure of FIG. 8. More particularly, the pocket wall (64) includes a circumferential slot (80) which opens radially inwardly toward surface (70) of valve member (61). The slot (80) receives a separate retainer (81) which preferably is formed as a spring clip which snaps into the slot (80). The retainer (81) projects radially out of the slot (80) and contacts the surface (70). In this embodiment, the diameter of the open end (68) remains undeformed and larger than the diameters of the other open end (65) and the valve member (61). This allows the valve member (61) to slide into the open end (68) and then held or retained therein by snapping the retainer (81) into the slot (80).

To accommodate self-centering movement of the valve member (61), the slot (80) is formed deeper than the retainer (81) so that a small clearance space (82) is formed at the bottom of the slot (80). This clearance space (82) extends about the entire periphery of the valve member (61) and wall (64). As such, the retainer (81) can slide within the slot (80) wherein the oversized pocket (63) allows movement of the valve member (61) in the X and Y directions. Preferably, there is sufficient clearance in the Z direction due to the clearance space (77). The retainer (81) then retains the valve member (61) within the pocket (63).

With the foregoing embodiments, the various forms of the valve member (35) and (61) are movable to a limited extent to allow for self-centering. In these embodiments, the seat (36) remains stationary while the valve members (35) and (61) are movable.

Figure 14:
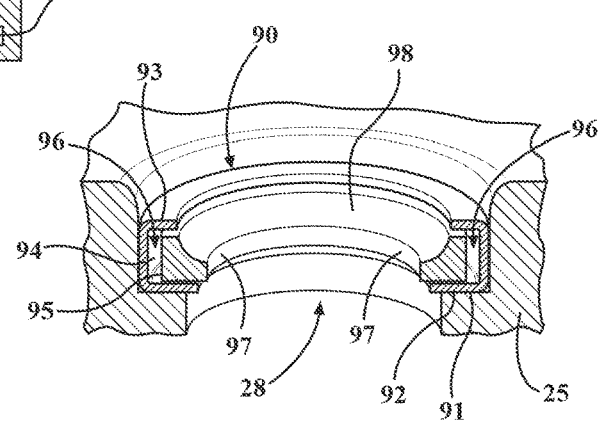
FIG. 14 is a side cross-sectional view of a further embodiment of a self-centering valve seat of the wastegate valve Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

In the alternative, a seat design may be provided which has a self-centering capability. In this regard, FIG. 14 is a side cross-sectional view of a self-centering valve seat (90) for the wastegate valve of the invention.

The valve seat (90) has an annular shape and is separately formed for later installation into the volute wall (25). The volute wall (25) includes a seat pocket (91), which defines the perimeter of the port (28). The bottom of this pocket (91) includes a stepped rim (92) which projects radially inwardly to define the port (28). The seat (90) is formed as an assembly which is insertable into the seat pocket (91). In this case, the seat (90) allows for self-centering engagement with any of the valve members (35) or (61) described above or even with a fixed, non-centering valve member which might be formed on the valve body.

The valve seat (90) comprises an annular housing (93) which has a C-shaped cross-section that opens sidewardly to define an annular channel (94). This housing (93) is dimensioned to fit into the seat pocket (91) so that it typically is non-movable within the pocket (91) after installation. The valve seat (90) further includes a seat ring (95) which is movably located within the channel (94). A clearance space (96) is defined radially between an outer diameter of the seat ring (95) and an inside diameter of the channel (94) wherein the seat ring (95) is movable through a limited extend in the X and Y directions and preferably in the Z direction.

The seat ring (95) is formed similar to seat 36 wherein the seat ring (95) includes an annular entry surface (97) which defines the perimeter of the port (28) and defines the entry side thereof through which exhaust gas enters said port (28). The entry surface (97) joins with an annular sealing surface (98) which faces towards any of the valve members (35) or (61) for sealing engagement therewith. In the illustrated embodiment of FIG. 14, the sealing surface (98) has an arcuate or partially concave shape which corresponds closely to the shape of the valve members (35) or (61).

To provide for self-centering of the valve members (35) or (61) relative to the valve seat (90), the seat ring (95) is movable within the housing (93). As such, the seat ring (95) is formed as an insert which fits within the wastegate port (28) and is free floating in the direction extending across the port (28) which further assists in self-centering of the valve components described above.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A turbocharger having a wastegate valve (32) and a wastegate port (28), said wastegate valve (32) comprising:
    a valve seat (36, 95) which surrounds said wastegate port (28) and defines a sealing surface (38);
    a valve body (34) which is movable toward and away from said wastegate port (28), said valve body (34) including a free-floating valve member (35, 61) the valve member (35) in the form of a partial sphere have the sealing surface (39) on one side and a flat interior face (41) on the opposite side which is sealingly engagable with said valve seat (36, 95) when said valve body (34) is in a closed position, said valve member (35, 61) being movably retained on said valve body (34) so as to be movable in a radial direction extending radially across said valve port (28) to allow self-centering of said valve member (35, 61) within said seat (36, 95),
    wherein said valve member (35, 61) is movable on said valve body (34) so as to be displaceable radially across said wastegate port (28) in response to radial contact forces between said valve member (35, 61) and said seat (36, 95)
    wherein said valve member (35, 61) is formed separate from said valve body (34) and has a sealing surface (39, 62) on one side, said valve body (34) including a pocket (42, 63) which receives said valve member (35) therein, said valve body (34) including retaining structure which interferes with said sealing surface (39, 62) to movably retain said valve member (35, 61) within said pocket (42, 63).

2. The wastegate valve according to claim 1, wherein said valve member (35, 61) has a shape which converges in the axial direction toward the wastegate port (28) so that contact forces between said valve member (35, 61) and said seat (36, 95) act in the radial direction.

3. The wastegate valve according to claim 1, wherein said valve member (35, 61) is movable in an axial direction extending through said wastegate port (28) so as to be movable axially toward and away from said seat (36, 95) in response to axial contact forces between said valve member (35, 61) and said seat (36, 95).

4. The wastegate valve according to claim 1, wherein said valve member (35) has a flat interior face (41) and said pocket (42) receives said valve member (35) therein with a bottom pocket face (44) facing toward said interior face (41) of said valve member (35).

5. The wastegate valve according to claim 1, wherein free-floating valve member (35) is formed less than a hemisphere.

6. A turbocharger having a wastegate valve (32) and a wastegate port (28), said wastegate valve (32) comprising:
    a valve seat (36, 95) which surrounds said wastegate port (28) and defines a sealing surface (38);
    a valve body (34) which is movable toward and away from said wastegate port (28), said valve body including a free-floating valve member (35, 61) which is sealingly engagable with said valve seat (36, 95) when said valve body (34) is in a closed position, said valve member (35, 61) being movably retained on said valve body (34) so as to be movable in a radial direction extending radially across said valve port (28) and an axial direction extending through said valve seat (36, 95) to allow self-centering of said valve member (35, 61) within said valve seat (36, 95), said valve member (35, 61) having a shape which converges in the axial direction toward the wastegate port (28) so that opposing surfaces of said valve member (35, 61) and said valve seat (36, 95) generate contact forces which act in the radial and axial directions, said valve member (35, 61) being movable within said pocket (42) so as to be displaceable radially across said wastegate port (28) in response to radial contact forces, and axially toward and away from said valve seat (36, 95) in response to axial contact forces to assist in providing a tight seal, and wherein said valve member (35) has an arcuate valve face (39) which corresponds to and abuttingly mates with an arcuate sealing surface (38) of said valve seat (36, 95).

7. The wastegate valve according to claim 6, wherein said valve member (35, 61) is formed separate from said valve body (34) and has a sealing surface (39, 62) on one side, said valve body (34) including a pocket (42, 63) which receives said valve member (35) therein, said valve body (34) including retaining structure which interferes with said sealing surface (39, 62) to movably retain said valve member (35, 61) within said pocket (42, 63).

8. The wastegate valve according to claim 7, wherein said retaining structure is fondled from one of a deformed wall structure or a retaining ring.

* * * * *